No. 789,792. Patented May 16, 1905.

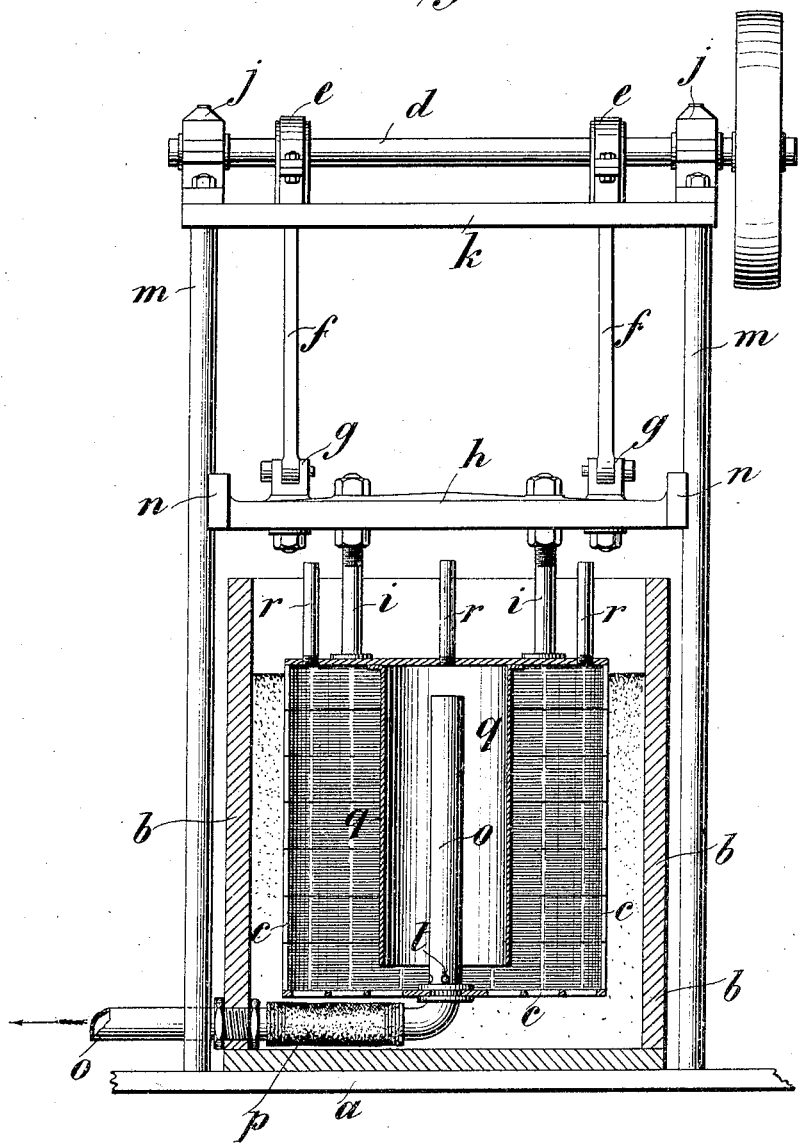

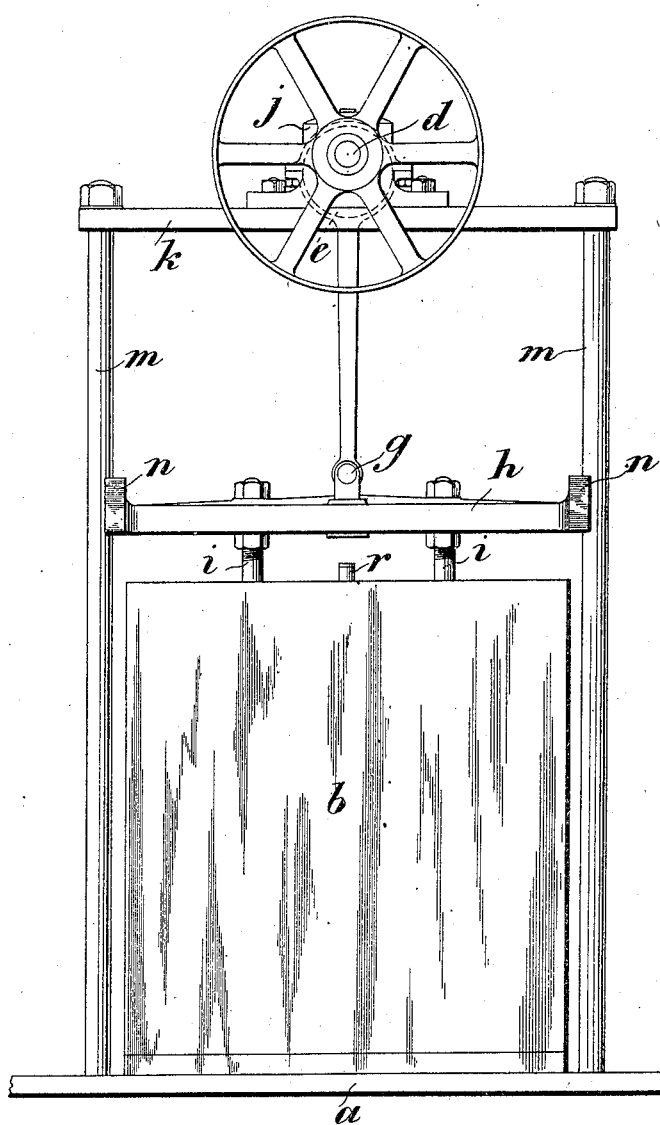

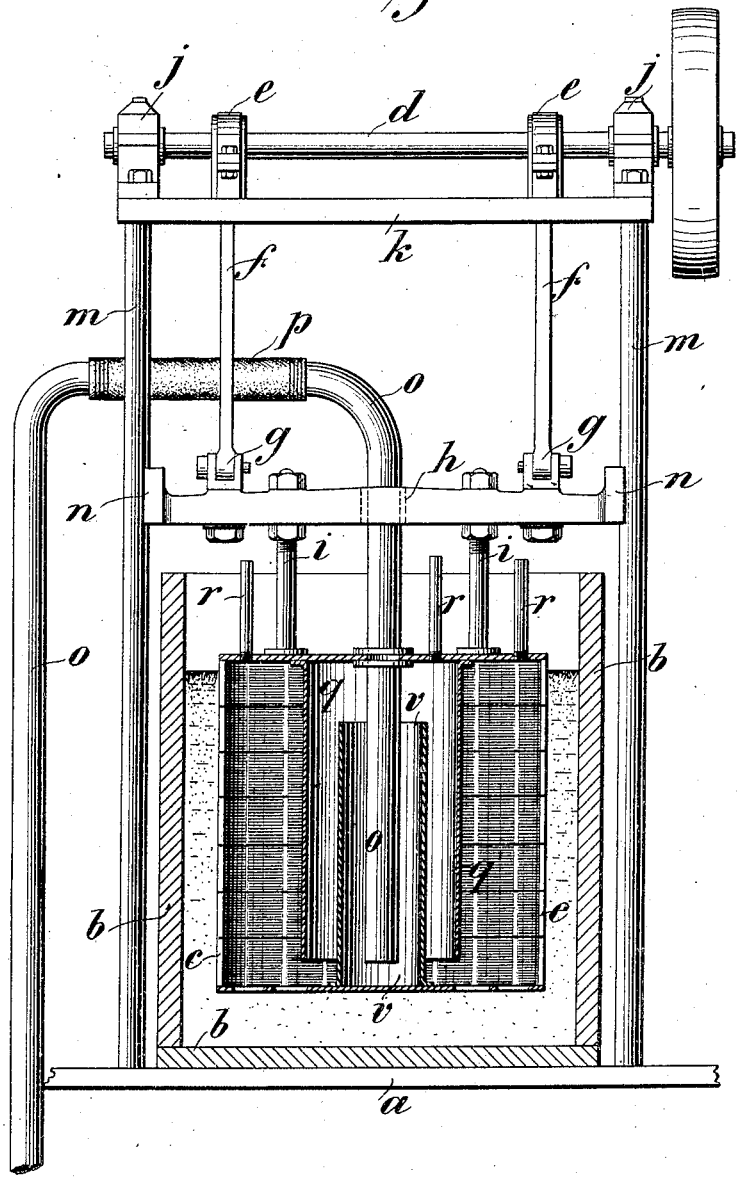

UNITED STATES PATENT OFFICE.

FREDERICK GEORGE BUSBRIDGE, OF WEST MALLING, ENGLAND.

PAPER-PULP-STRAINING APPARATUS.

SPECIFICATION forming part of Letters Patent No. 789,792, dated May 16, 1905.

Application filed December 28, 1903. Serial No. 186,807.

*To all whom it may concern:*

Be it known that I, FREDERICK GEORGE BUSBRIDGE, a subject of the King of Great Britain and Ireland, residing at West Malling, in the county of Kent, England, have invented Improvements in Straining Apparatus Suitable for Straining Paper-Pulp, of which the following is a specification.

This invention has reference to an improved construction of straining apparatus suitable for straining paper-pulp. According thereto within a suitable chamber (hereinafter referred to as the "vat") there is provided a vessel (hereinafter called the "strainer") whose walls are constructed with appropriately-formed slits or openings such as will allow material, such as paper-pulp of the proper consistency, to flow from the vat into the strainer, but will not permit lumps of material, such as what are called "knots," to pass. The interior of the strainer is placed in communication with a pipe through which the material can be drawn off from the strainer and also at its upper end with the external atmosphere, (it may be through a pipe or pipes,) and reciprocating motion is imparted to the strainer within the vat in suchwise as to agitate the material in the vat and in the strainer and also to lessen the liability to clogging. Apparatus to operate on this principle may be variously constructed.

Figure 1 of the accompanying illustrative drawings shows, partly in front elevation and partly in section, one arrangement of straining apparatus according to this invention. Fig. 2 is a side elevation thereof. Fig. 3 is a similar view to Fig. 1, showing another arrangement of straining apparatus according to this invention.

Referring to Figs. 1 and 2, $a$ is a base-plate. $b$ is a vat thereon and which is supplied with material, such as paper-pulp, through a ball-valve or otherwise, so as to maintain a practically constant level in the vat. $c$ is a strainer located within the vat $b$ and which may consist of a rectangular box the sides of which are formed of plates perforated with very fine V-shaped slits, as is usual in paper-pulp strainers. Reciprocating motion in a vertical sense is imparted to the strainer $c$ from a horizontal belt-driven shaft $d$ through eccentrics $e$, the lower ends of whose rods $f$ are pivotally connected at $g$ to a suitably-guided plate $h$, from which the strainer $c$ is suspended by rods $i$, the plate $h$ serving the twofold purpose of a cross-head and a cover to the vat $b$. The shaft $d$ is mounted in bearings $j$ on a plate $k$, fixed to the upper end of four vertical rods or columns $m$, which are secured at their lower ends to the base-plate $a$ and between which the vat $b$ is located. The combined cross-head and cover-plate $h$ is provided with guide-blocks $n$, which partially embrace the rods or columns $m$. The inner portion of the draw-off pipe $o$ passes through and is fixed to the bottom of the strainer $c$, and its lower portion extends through the side of the vat $b$, a portion $p$ of such pipe within the vat $b$ being of flexible material to allow of the desired movement of the strainer. The inlet end of the draw-off pipe $o$ extends upward within and near to the top of the strainer and is surrounded by a tubular division or pipe $q$, that extends downward from the top of the strainer to a point near to the bottom thereof, so as to prevent floating matter that may enter the strainer from passing to the draw-off pipe $o$. To the closed upper ends of the inner and outer compartments formed within the strainer by the tubular division $q$ are connected upwardly-extending air-inlet pipes $r$ to prevent a partial vacuum being set up therein. The arrangement is such that liquid material from the vat $b$ will enter the inner compartment of the strainer $c$ and flow over the top of the draw-off pipe $o$ when the strainer $c$ descends and will flow back from the outer compartment through the slits or openings in the strainer when the latter ascends, and thereby lessen the liability of such slits or openings to clog. The lower portion of the draw-off pipe $o$ within the strainer may, as shown, be formed with one or more small holes $t$ to allow of the strainer $c$ being completely emptied when desired. The operating-shaft $d$ may be arranged in any suitable position other than that shown, and the draw-off pipe $o$ may be passed through the bottom of the vat instead of through the side thereof. In some cases other appropriate means—such, for example, as cranks or cams—may be employed to actuate the strainer.

Instead of using a draw-off pipe extending downward from the bottom of the strainer c a draw-off pipe o may be used extending upward from near the bottom of the strainer through the top thereof and connected, through flexible piping p, to a downwardly-extending portion of the draw-off pipe o, as shown in Fig. 3. In this arrangement the draw-off pipe o may be arranged to act as a siphon. In this case it is advantageous to arrange within a tubular division q, extending downward from the top of the strainer c, as in the arrangement hereinbefore described, a second tubular division v, that extends upward from the bottom of the strainer and terminates at a short distance below the top thereof and surrounds the depending lower portion of the draw-off pipe o within the strainer, the arrangement being such that material of the kind mentioned will flow over the top of the inner tubular division v from the surrounding annular space and thence to the draw-off pipe o when the strainer c descends and material will flow from the outer portion of the strainer c back through the slits or openings therein into the vat b when the strainer ascends, so as to lessen liability of the slits or openings therein to clog.

What I claim is—

1. Straining apparatus comprising a vat for containing liquid to be strained, a strainer therein and having an overflow-outlet for strained material at a high level and means for reciprocating said strainer so that its outlet rises above and falls below the level of the liquid in the vat, as set forth.

2. Straining apparatus comprising a vat for containing liquid to be strained, a strainer therein and having an overflow-outlet for strained material at a high level, means for reciprocating said strainer so that its outlet rises above and falls below the level of the liquid in the vat, and means adapted to prevent floating matter passing into the outlet from the top of the liquid in the strainer, as set forth.

3. Straining apparatus comprising a vat for containing liquid to be strained, a strainer therein and having an overflow-outlet for strained material at a high level, means for reciprocating said strainer so that its outlet rises above and falls below the level of the liquid in the vat, and a tubular division extending from above downwardly around said outlet, as set forth.

4. In straining apparatus, a vat, a strainer located within said vat and whose upper end is in communication with the external atmosphere, an outlet for strained material at a high level and whose inlet end extends within the strainer, and means for reciprocating said strainer so that its outlet rises above and falls below the level of the liquid in the vat, substantially as set forth.

5. In straining apparatus, a vat, a strainer located within said vat and whose upper end is in communication with the external atmosphere, a draw-off pipe the inlet end of which extends within the strainer, a tubular division within said strainer and surrounding the inlet end of said pipe, and means for reciprocating said strainer, substantially as set forth.

6. In straining apparatus, a vat, a strainer located within said vat and whose upper end is in communication with the external atmosphere, a draw-off pipe that passes through the bottom of said strainer and the inlet end of which extends upward within and near to the top of the strainer, and means for reciprocating said strainer, substantially as set forth.

7. In straining apparatus, a vat, a strainer located within said vat and whose upper end is in communication with the external atmosphere, a draw-off pipe that passes through the bottom of said strainer, the inlet end of said pipe extending upward within the strainer to near the top thereof and the lower portion of said inlet end within the strainer being formed with holes, and means for reciprocating said strainer, substantially as set forth.

8. In straining apparatus, a vat, a strainer located within said vat and whose upper end is in communication with the external atmosphere, a draw-off pipe that passes through the bottom of said strainer, the inlet end of said pipe extending upward within, the strainer, a portion of said pipe external to the strainer being flexible, and means for reciprocating said strainer and pipe, as set forth.

9. In straining apparatus, a vat, a strainer located within said vat and whose upper end is in communication with the external atmosphere, a draw-off pipe the inlet end of which extends within the strainer, a portion of said pipe external to the strainer being flexible, a tubular division within said strainer and surrounding the inlet end of said pipe, and means for reciprocating said strainer, substantially as set forth.

10. In straining apparatus, a vat, a strainer located within said vat and whose upper end is in communication with the external atmosphere, a draw-off pipe that passes through the bottom of said strainer and through the wall of the vat, a portion of said pipe within the vat being flexible and means for reciprocating said strainer and pipe, substantially as described.

11. In straining apparatus, a vat, a strainer located within said vat and whose upper end is in communication with the external atmosphere, a draw-off pipe that passes through a wall of the vat and through the bottom of said strainer, the inlet end of said pipe extending upward within and near to the top of the strainer and a portion of said pipe within the vat being flexible, and means for reciprocating said strainer, substantially as set forth.

12. In straining apparatus, a vat, a strainer located within said vat and whose upper end is in communication with the external atmosphere, a draw-off pipe that passes through a wall of the vat and through the bottom of said strainer, the inlet end of said pipe extending upward within and near to the top of the strainer and the lower portion of said inlet end, within the strainer being formed with holes and also a portion of said pipe within the vat being flexible, and means for reciprocating said strainer, substantially as set forth.

13. In straining apparatus, a vat, a strainer located within said vat and whose upper end is in communication with the external atmosphere, a draw-off pipe the inlet end of which extends within the strainer, a tubular division surrounding the inlet end of said pipe and extending downward from the top of the strainer to near the bottom thereof, and means for reciprocating said strainer, substantially as set forth.

14. In straining apparatus, a vat, a strainer located within said vat and whose upper end is in communication with the external atmosphere, a draw-off pipe that passes through the bottom of said strainer and the inlet end of which extends upward within and near to the top of the strainer, a tubular division surrounding the inlet end of said pipe and extending downward from the top of the strainer to near the bottom thereof, and means for reciprocating said strainer, substantially as set forth.

15. In straining apparatus, a vat, a strainer located within said vat and whose upper end is in communication with the external atmosphere, a draw-off pipe that passes through the bottom of said strainer, the inlet end of said pipe extending upward within the strainer to near the top thereof and the lower portion of said inlet end within the strainer being formed with holes, a tubular division surrounding the inlet end of said pipe and extending downward from the top of the strainer to near the bottom thereof, and means for reciprocating said strainer, substantially as set forth.

16. In straining apparatus, a vat, a strainer located within said vat and whose upper end is in communication with the external atmosphere, a draw-off pipe that passes through a wall of the vat and through the bottom of said strainer, the inlet end of said pipe extending upward within and near to the top of the strainer, a portion of said pipe within the vat being flexible, a tubular division surrounding the inlet end of said pipe and extending downward from the top of the strainer to near the bottom thereof, and means for reciprocating said strainer, substantially as set forth.

17. In straining apparatus, a vat, a strainer located within said vat, a draw-off pipe passing through the side of the vat and a portion of which within the vat is flexible, the inlet end of said pipe extending upward within and near to the top of the strainer, a tubular division surrounding the inlet end of said pipe and extending downward from the top of the strainer to near the bottom thereof, air-inlet pipes communicating with the closed upper ends of the inner and outer compartments formed within the strainer by the said tubular division, and means for reciprocating said strainer, substantially as set forth.

18. In straining apparatus, a vat, a strainer located within said vat, a draw-off pipe passing through the side of the vat and a portion of which within the vat is flexible, the inlet end of said pipe extending upward within and near to the top of the strainer and being formed with holes at its lower portion within the strainer, a tubular division surrounding the inlet end of said pipe and extending downward from the top of the strainer to near the bottom thereof, air-inlet pipes communicating with the closed upper ends of the inner and outer compartments formed within the strainer by the said tubular division, and means for reciprocating said strainer, substantially as set forth.

19. In straining apparatus, a vat, a strainer located within said vat, a draw-off pipe passing through the side of the vat and a portion of which within the vat is flexible, the inlet end of said pipe extending upward within and near to the top of the strainer, a tubular division surrounding the inlet end of said pipe and extending downward from the top of the strainer to near the bottom thereof, air-inlet pipes communicating with the closed upper ends of the inner and outer compartments formed within the strainer by the said tubular division, a driving-shaft, eccentrics mounted thereon, a plate connected to the rods of said eccentrics, guides for said plate, and means connecting said plate to said strainer, substantially as set forth.

20. In straining apparatus, a vat, a strainer located within said vat, a draw-off pipe passing through the side of the vat and a portion of which within the vat is flexible, the inlet end of said pipe extending upward within and near to the top of the strainer, a tubular division surrounding the inlet end of said pipe and extending downward from the top of the strainer to near the bottom thereof, air-inlet pipes communicating with the closed upper ends of the inner and outer compartments formed within the strainer by the said tubular division, a driving-shaft, eccentrics mounted thereon, a plate connected to the rods of said eccentrics and adapted to form a cover to said vat, guides for said plate, and means connecting said plate to said strainer, substantially as set forth.

21. In straining apparatus, a vat, a strainer located within said vat, a draw-off pipe passing through the side of the vat and a portion of which within the vat is flexible, the inlet end of said pipe extending upward within and near to the top of the strainer, a tubular division surrounding the inlet end of said pipe and extending downward from the top of the strainer to near the bottom thereof, air-inlet pipes communicating with the closed upper ends of the inner and outer compartments formed within the strainer by the said tubular division, a driving-shaft, eccentrics mounted thereon and means connecting the rods of said eccentrics to said strainer, substantially as set forth.

22. In straining apparatus, a vat, a strainer located within said vat, whose upper end is in communication with the external atmosphere, and has an overflow-outlet for strained material at a high level and means for reciprocating said strainer so that its outlet rises above and falls below the level of the liquid in the vat, said means comprising a driving-shaft, eccentrics mounted thereon and means connecting the rods of said eccentrics to said strainer, as set forth.

Signed at London, England, this 8th day of December, 1903.

FREDERICK GEORGE BUSBRIDGE.

Witnesses:
 RICHARD FLETCHER POOLE,
 H. D. JAMESON.